Aug. 7, 1951 A. P. HULTGREN 2,563,604
STRAIN RELIEF BUSHING
Filed Nov. 5, 1949
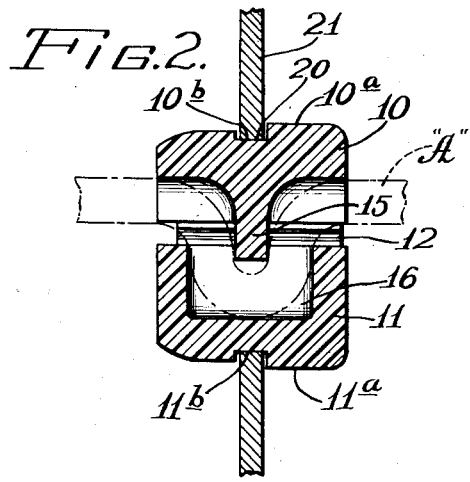
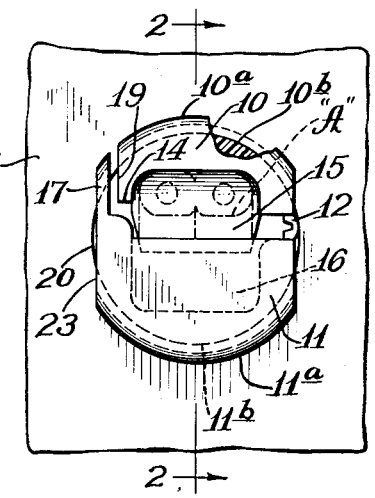
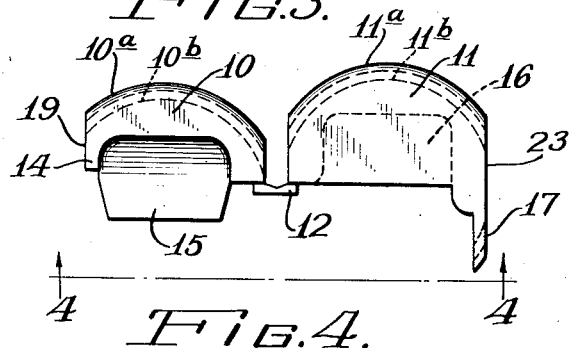
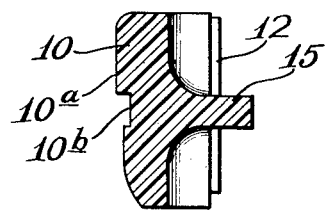
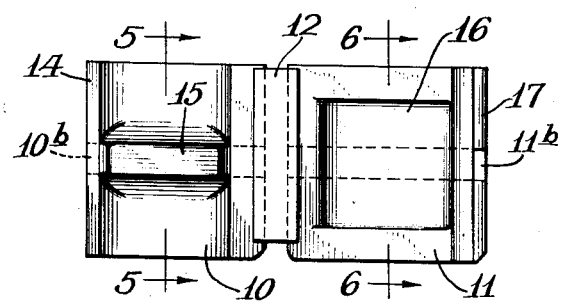
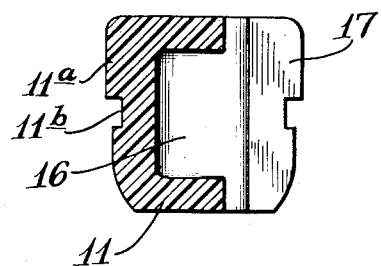
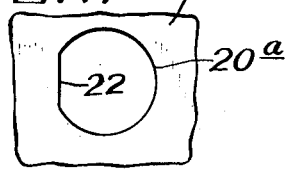
Inventor:
Arnold P. Hultgren
By Bair & Freeman
Attorneys Patented Aug. 7, 1951

2,563,604

UNITED STATES PATENT OFFICE 2,563,604

STRAIN RELIEF BUSHING

Arnold P. Hultgren, River Forest, Ill., assignor to American Molded Products Co., Chicago, Ill., a corporation of Illinois Application November 5, 1949, Serial No. 125,670

9 Claims. (Cl. 174—153)

This invention relates to a self-locking strain relief device, sometimes referred to as a bushing, which is adapted for firmly securing an electrical conductor or cable in an opening in a mounting member or support. Strain relief devices are employed in connection with various electrical appliances and apparatus, such as radio, television, fans, electric clocks, and many other forms of electrical devices and apparatus, and serve to relieve strain upon the electrical conductor wires or cables so as to avoid possible severance from or impair proper connection of the conductor wires to terminals to which they are normally connected, and to also preclude damage to parts and avoidance of possible short circuiting.

Strain relief devices for the above indicated purposes, have, over the course of years, been produced in various forms. One of the most widely and currently used types of strain relief devices is composed of two separate cooperating elements, each formed of suitable insulating material. In the use of such currently available strain relief devices, it has been found inconvenient and time consuming from the standpoint that the two parts require separate handling and necessitate the use of both hands of an assembler for interconnecting the two cooperating parts in embracing relation to a conductor wire or cable preparatory to engagement of the assembly by a suitable tool for insertion of the assembly in an opening of a mounting member. Furthermore, such currently available strain relief devices of the character referred to present production problems in that it is necessary to insure maintaining a balanced inventory of the two cooperating elements.

A primary object of the present invention is to provide a novel and improved strain relief device which eliminates the foregoing disadvantages and difficulties.

Another object is to provide a novel and improved strain relief device of the character indicated which may be conveniently and expeditiously applied to a conductor or cable by the use of one hand, preparatory to engagement of the device in assembled relation to the conductor by a suitable tool for assembly and mounting of the device and conductor in an opening in a mounting member.

A further object is to provide a novel and improved strain relief device of the character indicated formed of resilient, strong insulating material, comprising a pair of cooperating body members molded as an integral element, with a pair of corresponding edges of the two body members interconnected by a thin web of material to constitute a hinged connection, by virtue of which the two body members may with ease and facility be brought into cooperating relation for embracing a conductor wire or cable.

Still another object is to provide a novel and improved strain relief device of the character indicated, composed of two cooperating body members hingedly connected at a pair of corresponding edges, and wherein the hinge structure tends to normally urge the body members apart and thus insures proper locking engagement of the assembly on the marginal edge of an opening formed in the mounting member.

A still further object is to provide an improved strain relief device which is of simplified construction, efficient in use, economical to manufacture, and which, further, effects a substantial saving of time in use as compared with currently available devices of the same general character.

Other objects and advantages of this invention will be apparent from the following description, taken in connection with the accompanying drawing in which:

Figure 1 is an enlarged front elevational view of the strain relief device embodying the present invention shown in assembled relation in a mounting member;

Figure 2 is a vertical sectional view taken at line 2—2 on Figure 1;

Figure 3 is an end view of the device in its normal position as produced;

Figure 4 is an internal plan view of the device represented in Figure 3, taken as indicated at line 4—4 on Figure 3;

Figures 5 and 6 are sectional views through the device, taken as indicated respectively at lines 5—5 and 6—6 on Figure 4; and Figure 7 is a fragmentary view of a mounting member, shown with an opening having a flat face to cooperate wtih the device embodying the present invention, to preclude rotative movement of the device when mounted in the opening.

It is to be understood that the strain relief device embodying the present invention may be produced in various sizes for use in connection with different sizes of conductors or cables. The device as represented in the drawing, for convenience and clarity, is shown at a scale approximately four times actual size.

The device constituting the present invention is molded of suitable synthetic, plastic material having high insulating characteristics, and preferably a material that is of substantial strength and resilient in character, such as for example "nylon." The strain relief device is produced as an integral, unitary article, and comprises a pair of cooperating body members 10 and 11, of generally semi-cylindrical form. The two body members are interconnected, as may be clearly seen in Figures 1 and 3 of the drawings, at a pair of corresponding longitudinal edges, by a thin web indicated at 12 of the synthetic plastic material. The body member 10, at the edge opposite the hinge 12, is formed with a flange 14, and is also formed intermediate its length with a transversely extending gripping lug 15.

The body member 11 is formed with a recess or cavity 16, terminating at its opposite ends adjacent the respective ends of the body member, and as shown, the recess is of generally rectangular form. The gripping lug 15 is so positioned that it is aligned transversely, as may be seen in Figure 4, approximately centrally of the length of the recess 16. The marginal edge of the body member 11 opposite the hinge 12, is formed with a lip 17, which is adapted to cooperate with a flat shoulder 19 on the outer longitudinal edge of the body member 10, as may be seen in Figure 1 of the drawings, so as to constitute a lapped or closed joint for the cooperating free edge portions of the two body members when disposed in coacting relation.

The portions of the body member 10, at opposite sides of the gripping lug 15, when the body member 10 is in cooperating relation with the body member 11, as may be seen in Figures 1 and 2 of the drawing, together with the recess 16 in the body member 11, constitute a passageway for an electrical conductor, which is indicated in dot and dash outline at A. When the two body members are disposed in cooperating relation with a conductor embraced therebetween, a relatively sharp reverse bend is imposed in the conductor as seen in Figure 2, and thus effects a firm gripping relation between the conductor and body members for precluding longitudinal movement of the conductor relatively to the body members.

As may be seen in the drawing, coresponding ends of the two body members are enlarged to provide a flange as indicated at 10a and 11a as clearly shown in Figure 2, and the outer wall of each of the body members, immediately adjacent the respective flange portions, are formed with arcuate grooves 10b and 11b, adapted for cooperative seating engagement with respect to the marginal edge of an opening 20 formed in a mounting member, as indicated at 21.

For certain purposes, it may be desired that strain relief devices, when assembled in the mounting member, be secured against rotative movement in the opening. For this purpose as shown in Figure 7, the mounting member as indicated at 21a, is provided with a suitable opening 20a formed to provide a flat edge portion, as indicated at 22. For cooperation with the flat edge portion 22 of the opening, the strain relief device is provided with a corresponding flat face, on either or both of the body members, on the portion beyond the flange, and as shown in the drawing, the body member 11 is provided with a flat face 23 throughout its entire length for coaction with the flat edge portion 22 of the mounting plate opening.

The end of the body member, opposite the flange 10a and 11a, as may be seen in the drawing, is rounded or tapered to facilitate entrance of the assembled strain relief device into the opening in the mounting member.

The strain relief device embodying the present invention when produced is initially in the form as seen in Figures 3 and 4. By one hand, a person may pick up and place the strain relief device in cooperating relation to an electrical conductor or cable, after which a suitable tool may be employed on the flanges 10a and 11a to force the gripping lug 15 firmly against the conductor wire, to impart a reverse bend therein in the manner as clearly represented in Figure 2. The strain relief device, with the conductor so assembled, is then mounted into the opening of the mounting member, as seen in Figures 1 and 2, with the arcuate grooves 10b and 11b of the respective body members seated on the marginal portions of the opening 20. Due to the inherent resiliency of the covering of the conductor wire, the two body members tend, when the tool is disengaged therefrom, to separate and thus secure the assembly in firm, locked relation to the mounting member. Moreover, because of the resilient characteristics of the material from which the strain relief device is produced, the thin web 12 constituting the hinge between the two body members, further tends to normally separate the two body members, and thus further insures secure locking engagement of the device in the opening of the mounting member.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, one of said body members having a gripping lug shaped for freely extending into a recess formed in the other body member when said members are positioned in cooperating relation, the portions of said one body member, at opposite sides of the lug, and said recess being formed to constitute a passageway for the conductor, and the lug and recess, when in cooperating relation, serving to impart a sharp bend in the conductor for firmly gripping the conductor to preclude longitudinal movement of said conductor relatively to the body members.

2. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, the corresponding edge portions of said body members, opposite said hinge connection, being formed with interengaging features for precluding transverse shifting of one body member relatively to the other in one direction, said body members having cooperating features, adapted, when the body members are in cooperating relation, to firmly grip the conductor therebetween to preclude longitudinal movement of the conductor relatively to said body members.

3. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, the corresponding edge portions of said body members, opposite said hinge connection, being formed with interengaging features for precluding transverse shifting of one body member relatively to the other in one direction, said body members having cooperating features, adapted, when the body members are in cooperating relation, to firmly grip the conductor therebetween to preclude longitudinal movement of the conductor relatively to said body members, said features comprising a longitudinally extending, flat shoulder on one body member, and a longitudinally extending lip on the other member adapted for engaging said shoulder.

4. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, the corresponding edge portions of said body members, opposite said hinge connection, being formed with interengaging features for precluding transverse shifting of one body member relatively to the other in one direction, said body members having cooperating features, adapted, when the body members are in cooperating relation, to firmly grip the conductor therebetween to preclude longitudinal movement of the conductor relatively to said body members, said features comprising a longitudinally extending, flat shoulder on one body member, and a longitudinally extending lip on the other member adapted for engaging said shoulder, said other body member having a flat face, throughout the major portion of its length and extending to one end and being in the same plane as the outer surface of said lip for mounting said device non-rotatably in a flat sided hole in the mounting member.

5. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, said body members having cooperating features, adapted, when the body members are in cooperating relation, to firmly grip the conductor therebetween to preclude longitudinal movement of the conductor relatively to said body members, said body members each having a flange at one corresponding end only, and an arcuately extending groove immediately adjacent the flange for seating on the marginal edge portion of the hole in the mounting member.

6. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, one of said body members having a gripping lug shaped for freely extending into a recess formed in the other body member when said members are positioned in cooperating relation, the portions of said one body member, at opposite sides of the lug, and said recess being formed to constitute a passageway for the conductor, and the lug and recess, when in cooperating relation, serving to impart a sharp bend in the conductor for firmly gripping the conductor to preclude longitudinal movement of said conductor relatively to the body members, said body members each having a flange at one corresponding end only, and an arcuately extending groove immediately adjacent the flange for seating on the marginal edge portion of the hole in the mounting member.

7. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship, for embracing an electrical conductor, said body members having cooperating features, adapted, when the body members are in cooperating relation, to firmly grip the conductor therebetween to preclude longitudinal movement of the conductor relatively to said body members, said body members each having a flange at one corresponding end only, and an arcuately extending groove immediately adjacent the flange for seating on the marginal edge portion of the hole in the mounting member, one of said body members having a flat face, throughout the major portion of its length and extending to one end for mounting the device non-rotatably in a flat sided hole in the mounting member.

8. A strain relief device, molded as a unitary integral article of strong, resilient, insulating material for firmly securing a flexible electrical conductor in position in an opening in a mounting member, comprising a pair of cooperating body members interconnected at a pair of corresponding edge portions by a thin web of said material to constitute a hinge connection, whereby said members may be swung relatively to each other into coacting relationship for embracing an electrical conductor, said body members having cooperating features, adapted, when the body members are in cooperating relation, to firmly grip the conductor therebetween to preclude longitudinal movement of the conductor relatively to said body members, said body members each having a flange at one corresponding end only, and an arcuately extending groove immediately adjacent the flange for seating on the marginal edge portion of the hole in the mounting member, whereby, the resilient characteristics of the material constituting a thin web tends to urge said body members apart and insures maintenance of the groove portions in seated engagement with the marginal edge of the hole of the mounting member.

9. A strain relief device, molded as a unitary integral article of strong insulating material for firmly securing a flexible electrical conductor in position in an opening in a mounting member, comprising a pair of cooperating body members hingedly connected together at corresponding edge portions, whereby said members may be swung relatively to each other into coacting relationship for embracing an electrical conductor, one of said body members being formed with a longitudinal recess extending adjacent opposite ends thereof, the other body member having a transversely extending gripping lug disposed approximately central with respect to the length of the recess and adapted to enter the recess and be seated in spaced relation to the bottom thereof, the portions of said other body member, at opposite sides of the lug, together with the recess in the said one body member, constituting a passageway for the conductor.

ARNOLD P. HULTGREN.

REFERENCES CITED

The following references are of record in the file of this patent:

UNITED STATES PATENTS

| Number | Name | Date |
|---|---|---|
| 1,898,614 | Brady | Feb. 21, 1933 |
| 2,225,472 | Franklin | Dec. 17, 1940 |
| 2,424,759 | Klumpp | July 29, 1947 |

OTHER REFERENCES

Plastics Bulletin (Dupont), page 137, vol. 9, 1947. (Copy available in Div. 65, U. S. Patent Office.)